(12) United States Patent
Rubinshtein

(10) Patent No.: US 8,508,210 B2
(45) Date of Patent: Aug. 13, 2013

(54) APPARATUS AND METHOD FOR PULSE SAMPLING CONTROL

(76) Inventor: Peter Rubinshtein, Unley Park (AU)

( * ) Notice: Subject to any disclaimer, the term of this patent is extended or adjusted under 35 U.S.C. 154(b) by 474 days.

(21) Appl. No.: 12/741,785

(22) PCT Filed: Nov. 10, 2008

(86) PCT No.: PCT/AU2008/001654
§ 371 (c)(1),
(2), (4) Date: Aug. 2, 2010

(87) PCT Pub. No.: WO2009/059372
PCT Pub. Date: May 14, 2009

(65) Prior Publication Data
US 2010/0308787 A1    Dec. 9, 2010

(30) Foreign Application Priority Data
Nov. 9, 2007    (AU) ................................ 2007906155

(51) Int. Cl.
*H02M 5/00* (2006.01)
(52) U.S. Cl.
USPC ............ 323/304; 361/264; 361/265; 361/266
(58) Field of Classification Search
USPC .......................... 323/300, 304; 361/264–266
See application file for complete search history.

(56) References Cited

U.S. PATENT DOCUMENTS

| | | | |
|---|---|---|---|
| 4,256,951 A | 3/1981 | Payne et al. | |
| 4,377,739 A * | 3/1983 | Eckert, Jr. et al. | 219/497 |
| 4,871,961 A | 10/1989 | Kersten et al. | |
| 4,902,877 A * | 2/1990 | Grasso et al. | 219/483 |
| 5,293,028 A | 3/1994 | Payne | |
| 5,416,300 A * | 5/1995 | Hickl et al. | 219/262 |
| 6,028,421 A | 2/2000 | Kersten et al. | |

* cited by examiner

*Primary Examiner* — Adolf Berhane
*Assistant Examiner* — Yemane Mehari
(74) *Attorney, Agent, or Firm* — Sand & Sebolt

(57) ABSTRACT

The present invention proposes a hot surface igniter (HSI) controller which is transformerless and which is capable of delivering power from a 120/240 VAC RMS mains voltage, for example, to a load whose nominal operational voltage is equivalent to 24 VAC RMS, for example, sinusoidal full wave AC Voltage. The controller provides an impulse range which is mainly designed to deliver power to hot surface igniter active loads with sufficient thermionic inertia and mass, and where the real voltage shape of supplied power is unimportant. This is achieved by supplying half-cycle pulses to the HIS that are separated by even number of half-cycles that are not supplied to the HIS. Thus the consecutively applied half-cycles are always of opposing polarity.

7 Claims, 1 Drawing Sheet

APPARATUS AND METHOD FOR PULSE SAMPLING CONTROL

BACKGROUND OF THE INVENTION

The present invention relates to an apparatus and method for pulse sampling control and, in particular, to a controller for use with a hot surface igniter (HIS) using a method of pulse modulation based on mains half-cycle pulses as a single power unit.

In modern consumer domestic and industrial electric/electronic goods, low voltage heating devices with reasonable power consumption are becoming more prevalent. These devices range from tiny filament globes to very powerful industrial ovens and heaters.

Technologically, it is much easier and cheaper to make such devices with lower impedance heating elements. But more complicated problems typically arise when driving such loads, as they require the use of a broad range of power transformers with substantially uncontrolled AC currents. Expensive voltage and current regulators or pulse width modulation (PWM) with expensive drivers also need to be typically used.

It is therefore an object of the present invention to overcome at least some of the abovementioned problems or provide the public with a useful alternative.

It is a further object of the present invention to provide a controller for hot surface igniters which utilises a more flexible pulse modulation method than hitherto known controllers, based on mains half-cycle pulses as a single power unit.

SUMMARY OF THE INVENTION

Therefore in one form of the invention there is proposed an apparatus and method for pulse sampling control and, in particular, to a controller for use with a hot surface igniter using a method of pulse modulation based on mains half-cycle pulses as a single power unit.

In a further form of the invention there is proposed a method of controlling AC power delivered to a load from a power source where the nominal operational voltage of the load is smaller than the voltage of the power source said method including the steps of:

(a) receiving AC power from the power source;
(b) applying half of the full AC cycle pulse to the load;
(c) waiting for an even number of half-cycles to pass;
(d) applying half of the full AC cycle pulse;
(e) repeating steps (c) and (d) for a pre-determined time.

In preference every half cycle starts at 0 voltage, rises to its maximum and falls to 0 voltage.

In preference the even number of half-cycles missed ranges from 2 to 6 pulses missed.

In preference the first set of missed pulses may be different to the second missed set of pulses.

In preference the sets of missed pulses are distributed as evenly can be in time.

In preference the duty cycle can be described by the formula $$\text{Duty cycle} = 1/N = t/T = (v/V)^2,$$

where: $1/N$ is a duty cycle in %, $t$—the length of applied AC voltage half cycle, $T$—the length of missed AC voltage cycles, $V$—Applied voltage from AC voltage source, $v$—nominal voltage needed by load.

In preference the power applied to the load varies over time.

In a further form of the invention there is proposed an apparatus for controlling the voltage provided to a load where the voltage is derived from an AC power source, said apparatus including a controller that samples the duty cycle of the AC power source and selectively feeds alternating polarity half-cycles to the load wherein said half-cycles are separated by an even number of half-cycles so that consecutive half-cycles fed to the load are of opposing polarity.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings, where the active half of cycle phase is shown as black, we can see.

DESCRIPTION OF THE PREFERRED EMBODIMENTS

Figure 1:
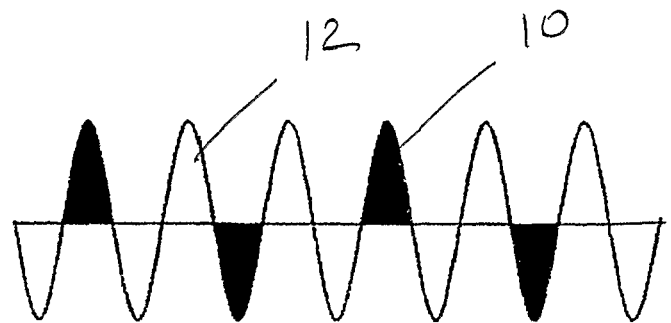
FIG. 1 illustrates a graph representing a half-cycle power control with pulse duty cycles equal to 1/3. This pulse range represents 1/3 of nominal power level delivered to the load under nominal voltage.

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

The present invention proposes a hot surface igniter (HSI) controller which is transformerless and which is capable of delivering power from a 120 VAC RMS mains voltage, for example, to a load whose nominal operational voltage is equivalent to 24 VAC RMS sinusoidal full wave AC Voltage. The controller provides an impulse range which is mainly designed to deliver power to hot surface igniter active loads with sufficient thermionic inertia and mass, and where the real voltage shape of supplied power is unimportant.

The controller operation is typically as follows:
1. Initialisation.
   During this period, the controller detects and evaluates input voltage parameters including voltage and frequency.
2. Preheating.
   During this period, the controller connects the HSI to the power through a relay and gradually, first very slowly and then more intensively, provides power to the "cold" HSI until it reaches the temperature close to its nominal one.

3. Main Ignition.

During this period, the controller maintains the HIS under nominal temperature for approximately 4-5 seconds for reliable gas ignition. The duty cycle during this period will be described in more detail below.

4. Flame verification.

During this period, the controller disconnects the HIS from the mains power supply and verifies flame presence between approximately 0.5-1 second.

5. Re-ignition.

If during the ignition period the flame is not established and flame verification indicates its absence, the controller repeats the whole ignition cycle starting from the initialisation stage. During re-ignition, the pre-heating stage is much shorter or completely absent to avoid overheating of the HSI.

6. Flame sensing.

During this period the controller detects flame presence and continues to stay in a "standby" mode until the flame is lost again or switched off by the operator. In case of flame loss it automatically switches on and re-ignites gas in approximately 2-3.5 seconds.

The total cycle period takes approximately 5-7 seconds per cycle. The cycling process will continue until the flame is established or may be limited by software, or the system is switched off by the operator. For flame detection and verification, the controller utilises a conventional flame rectification method which guarantees simple and reliable flame detection even under the smallest of simmer gas operation.

An important safety factor is to ensure the HSI element stays completely disconnected from dangerous 120V mains by a relay at all times when the HSI is not in an active heating stage. The HSI is still disconnected from mains even when the controller itself is connected to the mains and remains in operation under flame sensing mode.

The controller therefore works on the following basis to maintain the constant nominal temperature during the main ignition phase.

Where for example the standard mains voltage is 110/120 VAC, 50/60 Hz, the minimal easy controllable portion of applied energy from mains would be half the mains cycle pulse with the duration, varying from 8.33 millisecond (ms) at 60 Hz to 10.0 ms at 50 Hz. The mains half cycle portions of energy, of either positive or negative polarity in sequence, are controllable. The range of these opposite polarity pulses with different duty cycles could be applied to any active load which has reasonably high thermionic capacitance and prevents damage if this portion of the energy is applied.

Each of these mains half cycle pulses could be significantly bigger in Pick amplitude, but due to the particular duty cycle the total delivered RMS power will be equal to the power from this load nominal voltage.

Figure 2:
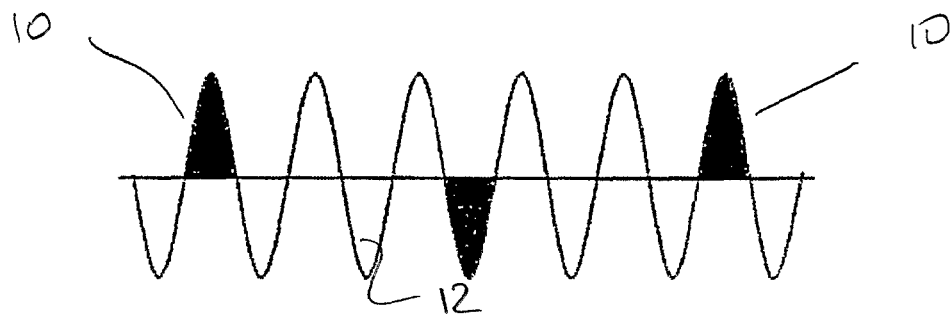
FIG. 2 illustrates a graph representing a half-cycle power control with pulse duty cycles equal to 1/5. This pulse range represents 1/5 of nominal power level delivered to the load under nominal voltage.

Therefore, for example, if the ratio between Supply voltage Uin and Nominal load voltage Uload is found to equal 3 (N=Uin/Uload=3) during initialisation/calibration, then the required duty cycle must be 1/9, where $1/9=(1/3)^2$. The duty cycle of 1/3 is illustrated in FIG. 1, whilst in FIG. 2 a duty cycle of 1/4 is shown. Filled areas 10 indicate the active positive and negative half cycles whilst empty areas 12 indicate the half cycles that are not passed to the load.

Figure 3:
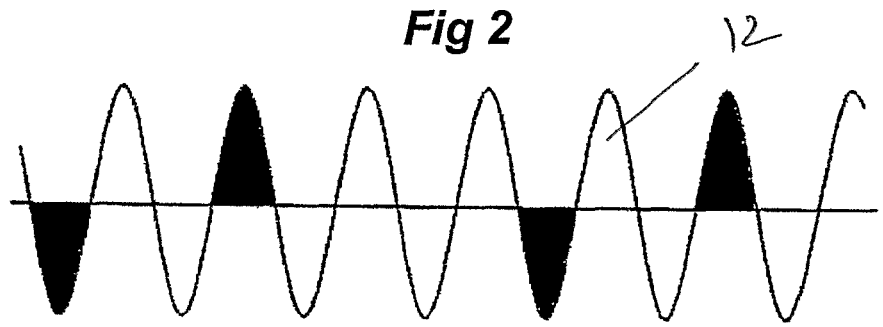
FIG. 3 illustrates a graph representing a half-cycle power control with a combination of pulse duty cycles equal to 1/3 and 1/5, the combined equivalent duty cycle equal to 1/4. This pulse range represents 1/4 of nominal power level delivered to the load under nominal voltage.

In ideal cases the distance (time) between positive and negative pulses should be the same to ensure better power delivery distribution. But sometimes it is impossible to achieve this. Therefore, for achieving duty cycle of say 1/4, the particular scheme combination of two different duty cycles 1/3 and 1/5 must be used. The resulting'duty cycle is shown in FIG. 3. This ratio is necessary when real input and required nominal voltage ratio N is equal to 2.

For more precise power delivery, more complicated variable duty cycle schemes could be obtained where the number on "non-active" cycles between "active" ones constantly changes in order to achiever the precise power delivery. The only important condition is that every next "active" pulse should always change polarity from the previous. The present invention is intended to utilise software designed and written for a microcontroller to provide the controller with all described algorithms to realize the proposed options in operation, in accordance with the above method.

The HSI controller has the following operational features:

It adjusts its timing parameters and pulse rate according to the input RMS voltage and frequency from mains or any type of AC generator;

It dynamically re-adjusts output power constantly during its operation if the mains voltage parameters change during this time, or parameters of HSI change too;

The controller could be programmed and calibrated for different input and output RMS voltages within ±50%. In this case the controller operates in the dynamical regime and keeps power delivery equal to previously "calibrated" voltage;

The controller also varies HSI "preheating" regime according to initial HSI temperature, resistance and variation of applied input voltage;

During the "non heating" stage, the controller always disconnects the HSI from mains and the solid state switching device.

Figure 4:
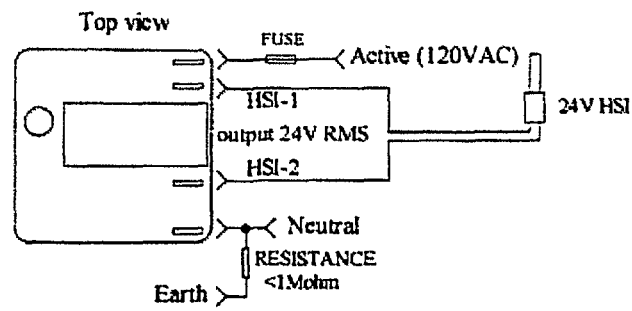
FIG. 4 illustrates a wiring diagram for the Re-ignition controller of the present invention for a 120 VAC input mains voltage supply.

FIG. 4 illustrates a wiring diagram for the re-igniter controller for a 120 VAC input mains voltage supply, in accordance with a preferred embodiment of the present invention.

The Controllable duty cycle (i.e. number of active half mains cycles and inactive pulses between supply pulses) enables control of the average power applied to any Load. It also changes the energy delivering profile of different working regimes such as pre/heating, variations in power consumption, cooling, operating under different external conditions, input voltage, thermal conductivity, energy dissipations, ambient condition variations, and so on.

Using only half cycle energy portions instead of full cycle mains pulses allows loads to be easier "digestible" without causing load damage or destruction. Using a twice smaller portion of energy also makes the total power control much more flexible and precise. Furthermore, using only an even number of alternative positive and negative half-cycle energy portions helps keep AC current consumption from mains absolutely symmetrical, with no any average DC offset. This is very important in some countries which have very strict regulation for AC current symmetry and DC offset.

The controller is therefore useful in a number of areas including domestic, commercial and industrial. It is especially beneficially for use with active loads.

For this system the total power/energy delivered to any load could be controlled by varying its duty cycle. This is a sequence of "active" (with current) and "passive" (no current) half-cycles. Such a "duty cycle" can be a function of pre-programmable controller, depending on a various factors such as applied AC voltage (requiring timing profile of applied power), properties of the load, and so on.

The proposed controller has another function in that it can automatically determine the mains frequency and voltage and can adjust its internal clock frequency and all internal timing parameters according to the input mains frequency and voltage. Such intelligent control can be realized by using a microcontroller, which further allows:

Predetermined programming of the software;

Automatic reaction on any internal parameters set up;

Immediate reaction on measurement of constantly changeable external parameters (Dynamical regime);

In operation this System/Controller can have many special features. They could be used in any combinations depending on the controller model, output parameters, specifications and requirements. The features may include:

Automatic power delivery adjustment to variable/changeable applied AC frequency;

Automatic power delivery adjustment to variable/changeable applied AC voltage;

Using fully controllable true AC zero-crossing for the electrical and EMC noise minimization;

Ability to operate independently as well as in conjunction with all other types of controllers;

For some applications it is universal and non polarized connection to mains and load;

Extremely small size and weight in comparison with conventional voltage and power controllers;

It can be embedded in any other electronic controller;

Extremely low power consumption and dissipation in comparison with transformers and autotransformers or conventional controllers;

Very broad range of power delivery (load current);

Simplicity and easy installation in applications; and

Insusceptible to hush and hazardous environments' conditions construction, encapsulated in flame retardant epoxy compound.

The present invention is intended for use with low voltage active loads with nominal operating voltage from 1.5 to 5 times smaller than applied (or mains) voltage, with total power consumption from tens of watts to kilowatts with reasonable thermionic inertia, and where power pulsing from a power supply with a frequency from 1 to 30 pulses per second does not cause any problems. This prevents damage and inappropriate performance. However it is to be understood that the current invention is not intended to be limited to only these settings.

In one embodiment of the invention the system (controller) consists of the following parts:

Intelligent core (microcontroller);

Input interface for direct and feedback parameters;

Output executive components (outputs), controlling current through the load (triacs, transistors, relays, etc.);

Programming interface for loading and reloading software in the program memory;

Power supply for microcontroller, functional blocks and peripherals;

Additional functional block (flame sensing circuit, temperature measuring circuit, etc.), used for particular controller system applications;

The software is preferably designed and written for the microcontroller to provide the controller with all described algorithms to realize the proposed options during the performed operation.

Each of those system parts may have a flexible and various schematic and construction, depending on a functional needs and electrical parameters of the particular controller.

If the entire system consists of a number of similar or different loads (from 2 to, say, 6) the so called "multi-point controller" could be used instead of so called "single point controllers". In this case the controller may have the required number of outputs, managed from the same intelligent core (microcontroller). In this case the entire system becomes simpler, cheaper and more compact and efficient in all terms.

This construction allows to spread active half-cycle pulses in time to avoid their multiple and simultaneous operation in the same mains period. In this case the power consumption from the mains supply becomes more even and "smooth" with less loss in wiring during high current pulse.

For complex appliances the different number of single controllers could be used, connected into one combined system.

As each of the controllers provides a series of high current pulses to drive its load, the very important issue becomes to make them all work asynchronously. In this case none of those controllers provide pulses in the same mains cycle. This prevents the mains supply source and supply line from overloading and switching off by circuit breakers and other protecting devices.

All involved controllers will operate in a similar manner as one multipoint unit does with spread active impulses over time. To provide this operating option all involved controllers must be connected together in chain in order to communicate between them. All controller units exchange the so called "preventive signals", which prevent units from simultaneous synchronized operation. All controllers dedicated to operate in a group will have special contacts/connectors/terminals/wires for exchanging "preventive signals".

The proposed controller could be used in all possible applications where low voltage loads are used and where the pulse power control is acceptable by the load. The practice shows that the best conditions could be achieved when the difference between supplied AC voltage and nominal load voltage is between 1.5 to 5 times. In this case the nominal power could be delivered to any load using the proposed pulse controlled method. One of the proposed applications can be the 24V load from 120 VAC mains. To maintain the proper power delivery and balance from this mains voltage the pulse rate should vary within 5-7 pulses per second, depending on mains frequency and mains voltage regulation. Thus, all type loads, which are capable to operate under such pulse rate, could be successfully driven with this type pulse controller. The higher load voltage rate, the more frequent pulse rate is required for an adequate power balance.

One of the most common and appropriate types of load are Hot Surface Igniters (HSI), as mentioned above, used for igniting air-gas mixtures in all types of gas appliances such as heaters, boilers, ovens and cook tops to name a few. Those HIS's have relatively high thermal inertia. For such loads the proposed controller of the present invention becomes an ideal solution.

For those loads which have very high difference in resistance in cold ("OFF") and hot ("ON") states the current value during initial pulses becomes a very serious destructive issue. For these cases the proposed controller provides so called "Preheating" dynamical regime during a short initial period similar to Phase Control, which provides for initially preheating a load (like all HIS need) to avoid over powering it, and then after "pre-heating" the controller switches into "normal pulse regime" for further safe non-destructive operation with the load.

The proposed controller design could be used with new Hot Surface Re-Igniter (HSRI), where a number of its positive properties enable it to not only safely and effectively drive the entire HSI, but also to measure very small flame current and commit re-ignition, if the flame has been lost.

The proposed controller design therefore has a number of benefits over existing controllers:

Driving low voltage loads without a transformer.

Driving a load with absolutely symmetrical and even AC voltage pulses range.

Driving a load with smaller energy portions equal to only half of the full AC voltage period/cycle.

Driving a load with true zero crossing method, excluding electrical noise emitting.

Driving a load with extremely small power consumption, power loss and dissipation.

Driving any load in any environmental conditions.

Driving a load grounded or floating. No polarity is important for some loads.

Extremely small size and weight in comparison with conventional voltage and power controllers.

Simplicity and easy installation in applications.

Driving a load with the ability of automatically adjust all regimes based on set up direct and constantly monitoring feedback parameters, including supplied voltage and frequency.

Ability to work as a multipoint system and as a group of single-point units combined in the system exchanging information between units and working not randomly/chaotically, but according to a particular algorithm.

Very sophisticated digital noise filtering in embedded software allows use of any number of those controllers operating together in the same gas appliance such a multi-burner cook top or oven or multi-element electrical heaters.

The present invention therefore provides a controller which has practically unlimited usage and applications in all areas, where miniaturization, simplicity, cost, convenience are the important concern.

For the purposes of the specification the word "comprising" means "including but not limited to", and the word "comprises" has a corresponding meaning. Also a reference within the specification to document or to prior use is not to be taken as an admission that the disclosure therein constitutes common general knowledge in Australia.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

The invention claimed is:

1. A method of controlling AC power delivered to a load from a power source where the nominal operational voltage of the load is smaller than the voltage of the power source, said method including the steps of:
   (a) receiving AC power from the power source;
   (b) applying half of a full AC cycle pulse to the load;
   (c) waiting for an even number of half-cycles to pass;
   (d) applying half of a full AC cycle pulse; and
   (e) repeating steps (c) and (d) according to a predetermined time wherein a duty cycle can be described by the formula Duty cycle=$1/N=t/T=(v/V)^2$, where: $1/N$ is a duty cycle in %, t—the length of applied AC voltage half cycle, T—the length of missed AC voltage cycles, V—Applied voltage from AC voltage source, v—nominal voltage needed by load.

2. The method as in claim 1, wherein every half cycle starts at 0 voltage, rises to its maximum and falls to 0 voltage again.

3. The method as in claim 1, wherein the even number of pulses missed ranges from 2 to 6 pulses missed.

4. The method as in claim 1 wherein a first set of missed pulses may be different to a second missed set of pulses.

5. The method as in claim 1 wherein the sets of missed pulses are distributed as evenly can be in time.

6. The method as in claim 1 wherein the power applied to the load varies over time.

7. The apparatus as in claim 1, wherein consecutive half AC cycles are always of opposite polarity.

\* \* \* \* \*